United States Patent [19]

Nees

[11] 3,941,617
[45] Mar. 2, 1976

[54] BATTERY PACKAGE AND METHOD
[75] Inventor: John M. Nees, Wyomissing, Pa.
[73] Assignee: General Battery Corporation, Reading, Pa.
[22] Filed: May 15, 1975
[21] Appl. No.: 577,911

[52] U.S. Cl. .............................. 136/170; 136/177
[51] Int. Cl.² .................................... H01M 2/12
[58] Field of Search ............ 136/177, 176, 166, 170

[56] References Cited
UNITED STATES PATENTS

| | | | |
|---|---|---|---|
| 1,758,545 | 5/1930 | Wallace | 136/177 |
| 2,972,001 | 2/1961 | Clingenpeel | 136/177 |
| 3,253,963 | 5/1966 | Sabatino | 136/177 |
| 3,652,341 | 3/1972 | Halsall et al. | 136/176 |
| 3,713,895 | 1/1973 | Consolloy | 136/166 |

Primary Examiner—Donald L. Walton
Attorney, Agent, or Firm—Frank J. Benasutti

[57] ABSTRACT

A wet cell storage battery which has been charged and contains electrolyte, has the electrolyte dumped, and then is prepared for storage in a condition with the residual electrolyte in the battery plates and separators within the battery cells. This preparation includes the application of a vented sealing strip to the ports of the battery, upon which strip is applied standard gang vents which are then held in place by a retaining means for shipment.

2 Claims, 7 Drawing Figures

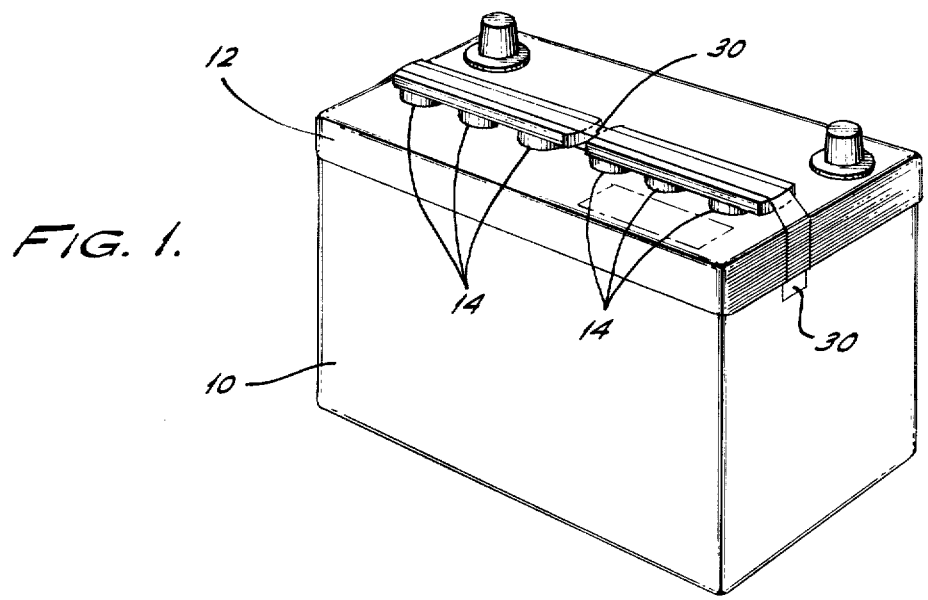
FIG. 1.
FIG. 4.
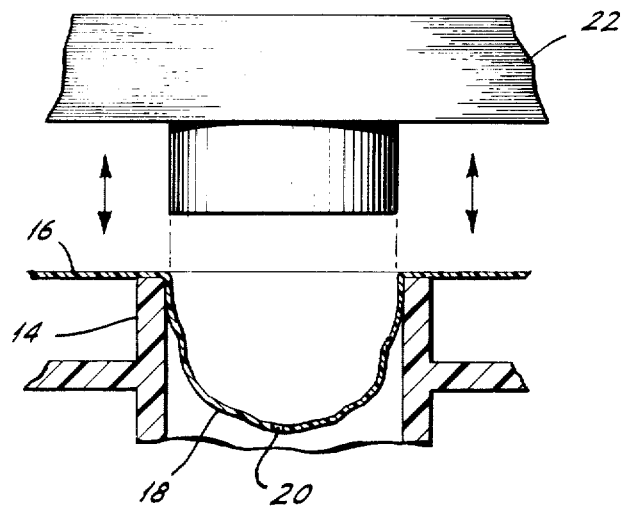
FIG. 5.
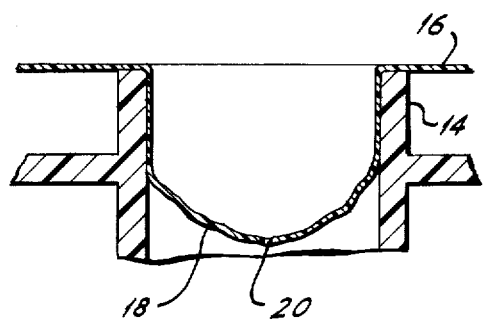
FIG. 6.
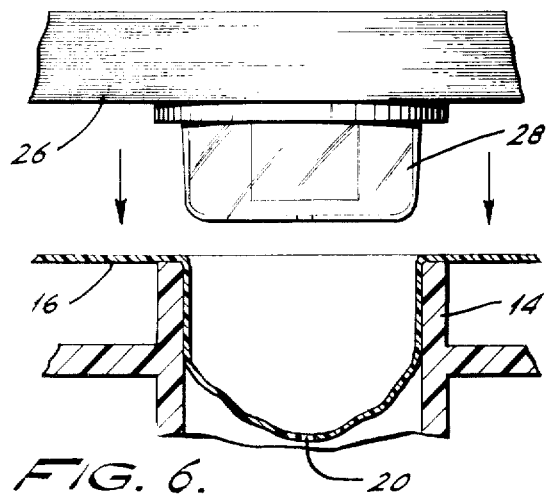
FIG. 7.
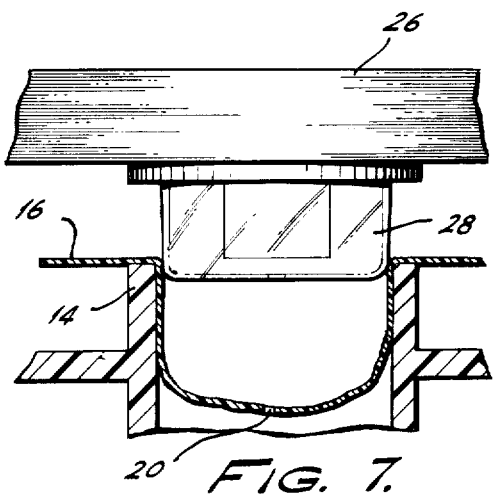

BATTERY PACKAGE AND METHOD

BACKGROUND OF THE INVENTION

This invention relates to the electric storage battery art, and more particularly, to a new and improved battery package and method of making same for shipping and storing of a wet cell electric storage battery which has been charged and dumped and which contains a residual amount of electrolyte in the battery plates and cells.

The so-called charged and dumped battery has been well known for decades. Such batteries are produced for many purposes, including without limitation, the prevention of spillage of the electrolyte during transit and the increased storage life while the battery is being stored. In the prior art, numerous venting mechanisms have been provided so that the storage battery in a fully charged condition may be stored after removal of the electrolyte for many months without material loss of capacity and without developing excessive pressure. See for example, the patent to J. L. Woodbridge No. 1,816,035 issued July 28, 1931, and the patents to C. C. Wallace, Nos. 1,758,545 and 1,907,911, issued in the 1930s. These patents show that it is old in the art to provide vent caps with holes therein having very small cross sections. The Wallace No. 1,758,545 shows a device which provides a horizontal opening of a very small diameter with respect to its length. The Woodbridge patent provides a duct which has a cross section of a diameter not over 5% of its length. Both patents refer to a capillary duct of minute cross section. More recently, the Sabatino Pat. No. 3,253,963 deals generally with the same problems. These patents show individual vent plugs which are either rather complicated in structure or require a substantial amount of material.

As the art developed, vent plugs were produced in gangs of three; commonly used on automobile batteries today. These vents are intricate in design because of the demands placed on operating batteries in an automobile not only by the electrical system of the automobile, but also by automotive safety engineers and authorities in government. Such modern day gang vents are not for storage purposes, but rather are for operating purposes, and will be distinguished in this application as such.

SUMMARY OF THE INVENTION

It is an object of the present invention to provide a simple venting device for use in combination with a charged and dumped battery, so that the battery may be shipped and stored inexpensively and with maximum effectiveness in terms of shelf life. In furtherance of this object, I have provided a thin strip of plastic material having a plurality of indentations therein forming protrusions, each of which has a small vent hole in it. This piece of plastic is applied to all of the vent openings in a charged and dumped battery to provide the initial seal and the advantages disclosed in the prior art. In addition to this strip, the standard vent caps are applied to the indentations and are retained for shipment and storage by an overlying tape attached to the battery casing.

The above object as well as other objects will become apparent from the following description with reference to the accompanying drawings.

BRIEF DESCRIPTION OF THE DRAWINGS

FIG. 1 is a perspective view of a completed battery package in accordance with the preferred embodiment of the present invention;

FIG. 4 is a greatly enlarged section of a portion of the device shown in FIG. 3 with the parts repositioned in partial assembly;

FIG. 5 is a section similar to FIG. 4 showing portions of the battery package after partial assembly;

FIG. 6 is a section similar to FIG. 5, showing an additional element of the combined battery package prior to assembly; and FIG. 7 is a section similar to FIG. 6 showing the element therein in the course of being assembled with the battery package.

DESCRIPTION OF THE PREFERRED EMBODIMENT

Figure 3:
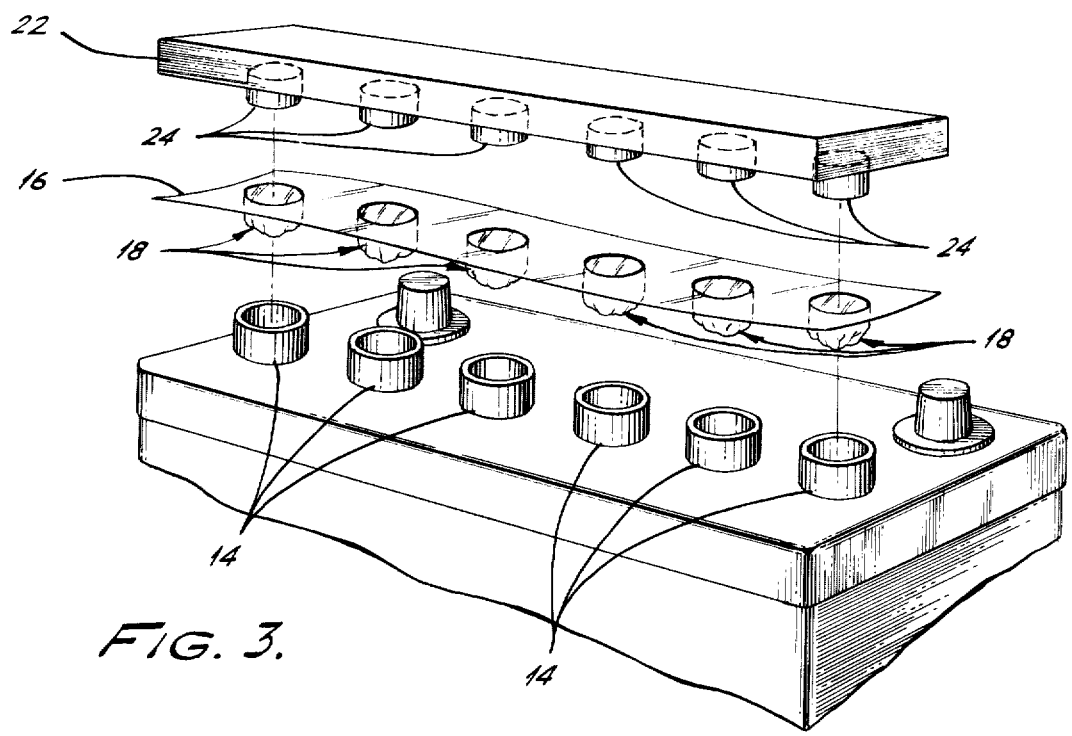
FIG. 3 is an enlarged exploded perspective view of a portion of the elements of the battery package shown in FIG. 1, with an additional assembly element shown.

Although specific forms of the invention have been selected for illustration in the drawings, and the following description is drawn in specific terms for the purpose of describing these forms of the invention, this description is not intended to limit the scope of the invention which is defined in the appended claims.

Referring to the figures, in FIG. 1 there is shown a perspective view of an assembled battery package wherein the battery casing 10 comprises a structure housing six battery cells for a wet cell electric storage battery which has a cover 12, having six vent openings 14 formed integrally with the cover. The openings or ports 14 are shown in slightly larger proportions in FIG. 3. While the battery shown is a wet cell battery when put in actual commercial use, the present invention applies to this battery in a condition between the time it is initially charged and the time it is put into commercial use. In particular, this invention applies to the condition of this battery after it has had the electrolyte dumped from it; and more particularly, to the condition wherein there is a residual electrolyte left in the battery in engagement with the plates and separators (that is its condition in FIG. 1).

As stated before, it is desirable to vent such a battery in a controlled manner, and in particular, each cell is vented by a separate vent cap. In accordance with my invention, I provide a venting strip means for performing a number of desirable functions, including venting of each of the cells in the battery. This venting strip means is shown as number 16 in FIG. 3 and comprises a plastic strip of material on the order of 0.004 inches thick made of polyvinylchloride. Into this strip I have formed a number of indentations (when viewed from above, as shown in FIG. 3) which provide protrusions (when viewed from below, as shown in FIG. 3) designated generally 18. To give some idea of the dimensions of this strip, a typical strip may be 1¾ inches wide by 9 31/32 inches long and have a plurality of indentations, each of which being on the order of ¾ of an inch in diameter. Approximately in the center of the bottom of each of these indentations or protrusions 18 is a hole which, for the dimensions given thus far, would be on the order of 0.006 to 0.010 inches in diameter. One such hole is shown in FIGS. 4–7 and is designated 20.

Of course, it will be appreciated that the dimensions of the strip itself could vary in accordance with the particular battery upon which the strip is to be used. However, the following parameters are important in determining these dimensions. It is my desire to have the strip in an interference fit along the outer portion of the protrusions with the inner portion of the port in the battery cover. It is further my desire, to have an interference fit between the outer portion of the protrusion of the standard vent plug which is part of a gang vent and the inner portion of the indentation forming the protrusion in the strip. Since the standard gang vent is already designed to be in an interference fit along its outer portion with the inner portion of the port in the battery cover, the polyvinylchloride strip must be extremely thin and yet at the same time stable dimensionally when applied to the battery so that it forms a good seal and provides the necessary venting during shipping and storage. The thinness of the strip plus the design of standard vent plugs and gang vents provides the necessary structure to accomplish the desirable ends of my invention. In particular, the standard gang vent plug has rounded leading edges and is in general a thin walled plastic cylinder 28, as shown in FIG. 6. This cylinder may have a slight taper on its sides from its base toward its outermost end. The effect of this will be described more fully hereinafter.

To apply this strip to the charged and dumped battery, I have designed a fixture which comprises a block of wood or other similar material 22, FIG. 3, having a plurality of substantially cylindrical protrusions 24 extending from one surface thereof. The strip 16 in its initial condition is shown in FIG. 3 wherein it will be noted that the protrusions are not particularly cylindrical in shape, but rather are bag-like. To position the strip, I insert the protrusions at the outermost ends into the ports at the outermost ends of the battery cover. This insertion is accomplished by hand.

Next, I position the wooden block with the protrusions 24 adjacent to the indentations in the strip and tap the block with a mallet or other similar instrument with sufficient force to drive the protrusions of the strip 16 into a fully seated condition with all of the ports. Referring to FIGS. 4 and 5, this operation can be noted. In FIG. 4, the protrusion 18 is disposed in the port 14 with the block 22 positioned above it. The block is then driven downwardly until it seats the protrusion in fully sealed engagement with the inner wall of the port 14 as shown in FIG. 5. The block 22 is then removed upwardly, leaving the strip in a sealed condition with the walls of the port. The thin flexible material will not remain in this condition during shipping, however, and accordingly, I have designed the strip so that it will accommodate the standard gang vent 26.

Figure 2:
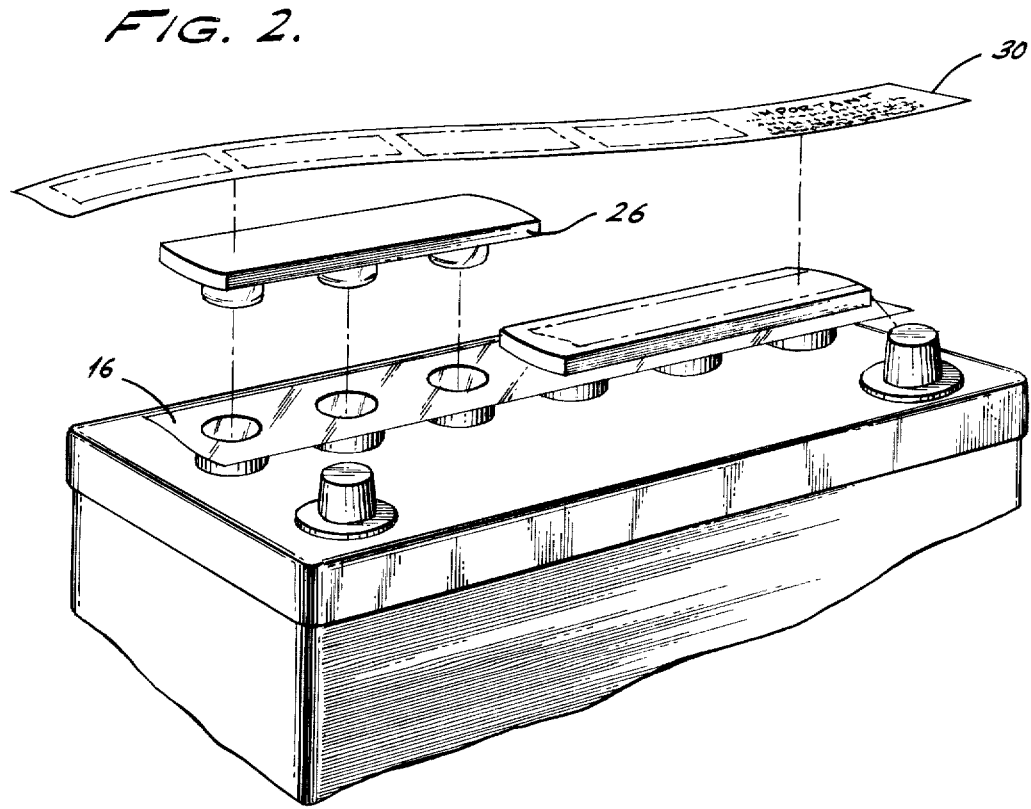
FIG. 2 is an enlarged exploded reoriented perspective view of a portion of the battery package shown in FIG. 1.

Referring to FIGS. 2, 6 and 7, it will be noted that the gang vent 26 is next applied over the strip so that the protrusion 28 of the gang vent 26 enters at least partially the indentation in the strip 16. In FIG. 7 the extreme condition is shown wherein the protrusion 28 of the gang vent can just barely enter the top portion of the indentation. This condition would obtain when the tolerances are such that the maximum interference fit is provided. In other cases, the tolerances may be at the other limits so that there is minimal interference fit and the protrusion 28 will enter almost to the point of being fully seated. However, it is expected that in most cases the protrusions of the gang vents will not fully enter the indentations. As previously stated, many of the gang vents have a slight taper and in general are composed of a thin-walled plastic material in a substantially cylindrical shape which tends to collapse or elongate slightly when forced into the interference fit relationship shown in FIG. 7. This allows the mating interference condition to exist, even though in operation the gang vent would normally be in interference relation with the port 14 in the cover. In this regard, it will be noted that the drawings, particularly FIGS. 6 and 7, are meant for purposes of illustration only and are not to be considered to be scale drawings.

Since, as stated, the gang vents will not be fully seated, they are in an unstable or only partially assembled condition when considered in light of the normal condition of full assembly with a completed operational battery. To retain the gang vents during shipment in their unstable condition, I have provided a retaining strip 30, having a self-adhering surface along at least on surface thereof, which is applied to the upper portion of the gang vents as shown in FIG. 1, and extends beyond the outer limits of the gang vents to grip the side walls of the battery as shown in FIG. 1.

The retaining strip is shown in the exploded view in perspective in FIG. 2. Notice that the upper surface has phantom lines and the appearance of printing toward the right hand side. This is to show that most advantageously, the notice with respect to the handling of the vent cap is printed right on this strip. In particular, a notice could be printed indicating that it was important not to remove the strip until it was desired to fill the battery with electrolyte for use. There might also be a notice to prospective users to discard the plastic sealing strip 16 once it has been removed, and then replace the standard gang vents.

From what has been described, it will be apparent that I have provided a wholly new battery package and a wholly new method of assembling, shipping and storing a battery of the charged and dumped type.

It will be understood that various changes in the details, materials and arrangements of parts which have been herein described and illustrated in order to explain the nature of this invention may be made by those skilled in the art within the principle and scope of the invention as expressed in the following claims.

It will further be understood that the "Abstract of the Disclosure" set forth above is intended to provide a non-legal technical statement of the contents of the disclosure in compliance with the Rules of Practice of the United States Patent Office, and is not intended to limit the scope of the invention described and claimed herein.

What is claimed is:

1. A charged and dumped battery package, comprising: a charged and dumped battery casing with residual electrolyte therein and having vent ports therein; battery sealing strip means comprising a thin sheet of plastic material having a plurality of indentations therein forming protrusions extending from one side thereof, each of said protrusions having a minute vent hole therein, said protrusions engaging the vent ports of said battery casing in interference fit therewith; a plurality of standard vents having protrusions engaging the indentations in said strip; and a retaining means engaging said standard vents and said battery casing to retain said standard vents in engagement with said indentations.

2. A method of assembling a charged and dumped battery package having vent ports therein and having a sealing strip comprising a thin sheet of plastic material having a plurality of indentations therein forming protrusions extending from one side thereof, comprising the steps of: inserting at least some of said protrusions into the vent ports of said battery in the charged and dumped condition; simultaneously setting all of the protrusions of said strip into all of the ports of said battery so that the outer walls of said protrusions are in interference fit with the inner walls of said ports; applying standard vents having protrusions to the indentations in said strip so that said protrusions engage said indentations; applying a retaining means to said standard vents to retain them in engagement with said strip; and fixedly engaging said retaining means with said battery casing to retain said vents.

* * * * *